(12) United States Patent
Norberg et al.

(10) Patent No.: US 10,134,571 B1
(45) Date of Patent: Nov. 20, 2018

(54) DETECTOR FOR INCIDENT RADIATION

(71) Applicant: C-Rad Imaging AB, Uppsala (SE)

(72) Inventors: Gunnar Norberg, Uppsala (SE);
Daniel Muñoz, Solna (SE)

(73) Assignee: C-Rad Imaging AB, Uppsala (SE)

( * ) Notice: Subject to any disclaimer, the term of this patent is extended or adjusted under 35 U.S.C. 154(b) by 0 days.

(21) Appl. No.: 15/880,612

(22) Filed: Jan. 26, 2018

(51) Int. Cl.
*H01J 47/02* (2006.01)
*G01T 1/28* (2006.01)
*H04N 5/32* (2006.01)
*H01J 31/08* (2006.01)
*G01T 1/185* (2006.01)
*G06T 1/00* (2006.01)

(52) U.S. Cl.
CPC ............ *H01J 47/022* (2013.01); *G01T 1/185* (2013.01); *G01T 1/28* (2013.01); *H01J 31/08* (2013.01); *H04N 5/32* (2013.01); *G06T 1/00* (2013.01)

(58) Field of Classification Search
CPC ......... H01J 47/022; H01J 31/08; G01T 1/185; G01T 1/28; H04N 5/32; G06T 1/00
See application file for complete search history.

(56) References Cited

U.S. PATENT DOCUMENTS

| | | | |
|---|---|---|---|
| 3,317,823 A * | 5/1967 | Brodsky | G01T 1/185 250/374 |
| 5,021,666 A | 6/1991 | Reber | |
| 6,177,676 B1 | 1/2001 | Wickman et al. | |
| 6,337,482 B1 * | 1/2002 | Francke | G01T 1/365 250/374 |
| 6,365,902 B1 | 4/2002 | Francke et al. | |
| 6,476,397 B1 | 11/2002 | Francke | |

(Continued)

FOREIGN PATENT DOCUMENTS

| | | |
|---|---|---|
| WO | 2007/061235 A1 | 5/2007 |
| WO | 2015/034419 A1 | 3/2015 |
| WO | 2016/139248 A1 | 9/2016 |

OTHER PUBLICATIONS

Janina Ostling, New Efficient Detector for Radiation Therapy Imaging using Gas Electron Multipliers, Karolinska Institute & Stockholm University, pp. 1-49 (2006).

(Continued)

*Primary Examiner* — Marcus Taningco
(74) *Attorney, Agent, or Firm* — Porter Wright Morris & Arthur LLP

(57) ABSTRACT

A detector (100) comprises an upstream ionization chamber (110), a downstream detector chamber (120) and a signal processor (160). The ionization chamber (110) comprises a first electrode (111), a second electrode (112) and an ionization chamber gas (114). The detector chamber (120) comprises a converter unit (130) adapted to convert incident radiation (6) into electrons (8), an electron amplification device (140) adapted to produce further electrons (9) from the electrons (8), a read-out device (150) adapted to generate a signal representative of the incident radiation (6) and a detector chamber gas (121). The signal processor (160) is adapted to generate a corrected signal by processing the signal representative of the incident radiation (6) based on a current signal representative of an ionization current measured between the first electrode (111) and the second electrode (112) and induced by the incident radiation (6).

30 Claims, 8 Drawing Sheets

(56) References Cited

U.S. PATENT DOCUMENTS

| | | | |
|---|---|---|---|
| 6,841,784 B2 | 1/2005 | Brahme et al. | |
| 7,663,081 B2 | 2/2010 | Hahn et al. | |
| 7,994,483 B2 | 8/2011 | Tamagawa et al. | |
| 8,134,129 B2 | 3/2012 | Tokanai et al. | |
| 8,866,073 B2 | 10/2014 | Goedecke | |
| 9,851,452 B2 | 12/2017 | Maad et al. | |
| 2002/0149305 A1 | 10/2002 | Danielsson et al. | |
| 2003/0227996 A1* | 12/2003 | Francke | A61B 6/4035 378/5 |
| 2015/0060685 A1* | 3/2015 | Maad | G01T 1/2935 250/385.1 |
| 2015/0115992 A1* | 4/2015 | Fushie | H01J 43/246 324/759.01 |
| 2016/0133447 A1 | 5/2016 | Degtiarenko | |
| 2016/0259065 A1 | 9/2016 | Maad | |
| 2017/0112457 A1* | 4/2017 | Allinson | A61B 6/4241 |

OTHER PUBLICATIONS

C. Iacobaeus et al., Study of Capillary-based gaseous detectors, IEEE Transactions on Nuclear Science, vol. 51, Issue 3, pp. 952-959 (2004).

Gordon et al., Image reconstruction from projections, Sci Am., 233(4): 56-68 (1975).

\* cited by examiner

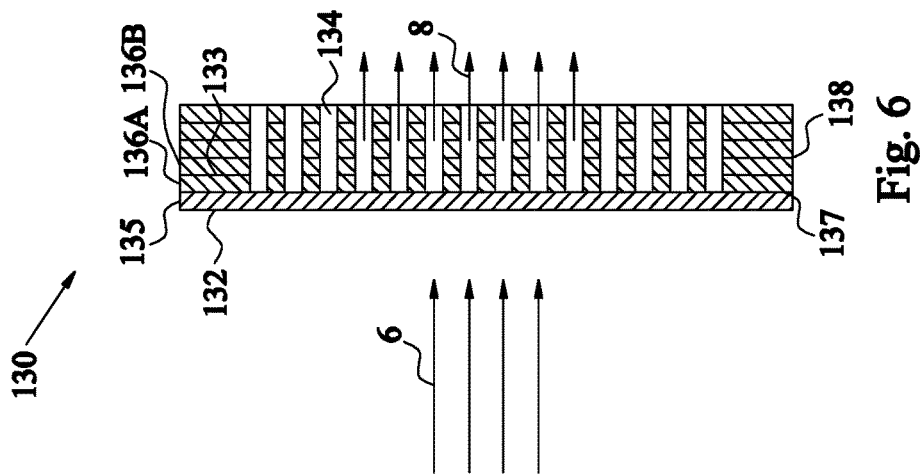
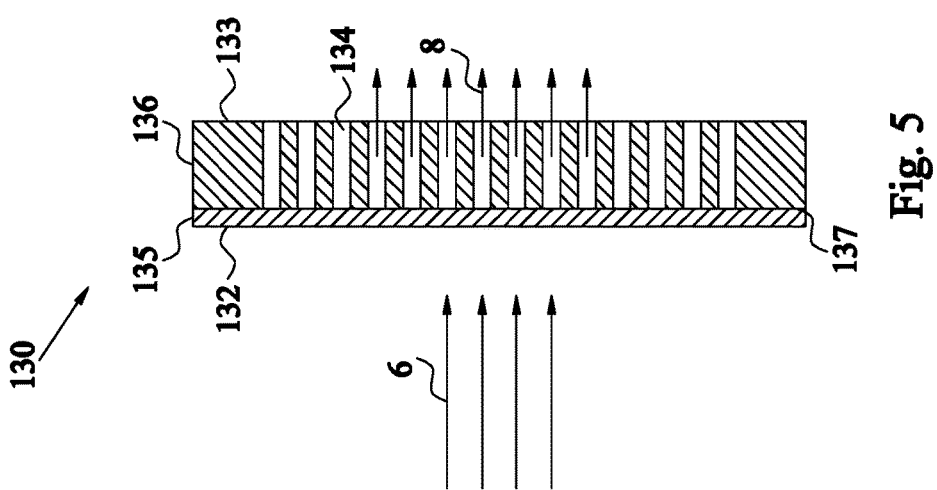
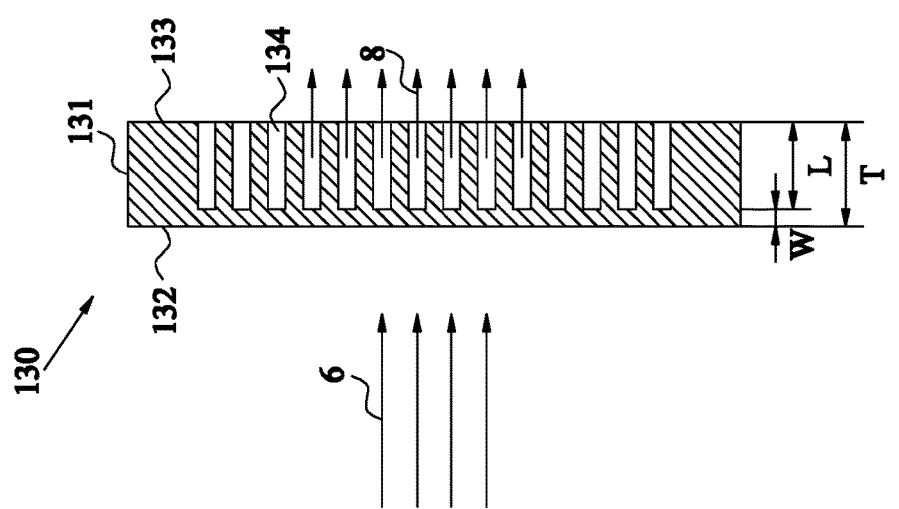

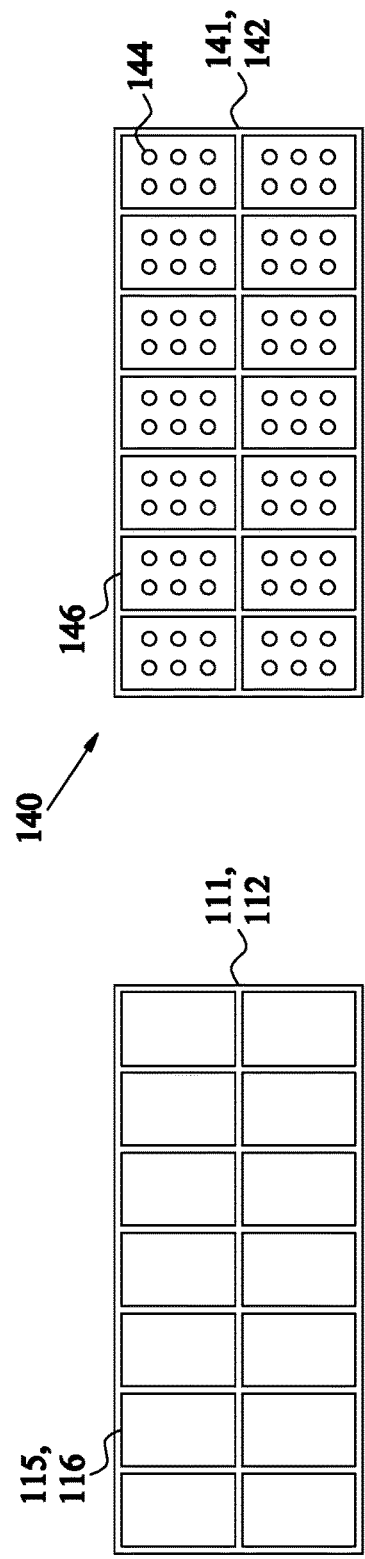
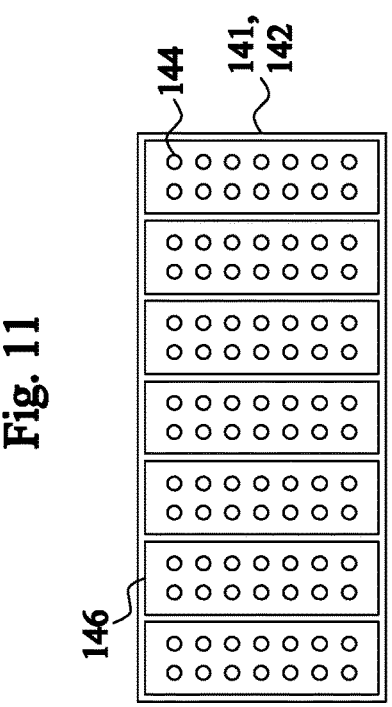
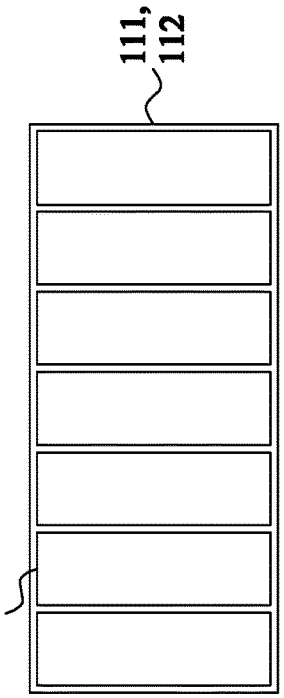
Fig. 9
Fig. 10
Fig. 11
Fig. 12

DETECTOR FOR INCIDENT RADIATION

TECHNICAL FIELD

The present embodiments generally relate to a detector for incident radiation and to a method of generating an image frame based on detected incident radiation.

BACKGROUND

Detectors are used to detect radiation and provide spatial mapping of radiation intensity in radiation-based imaging systems. Such systems involve detection of incoming radiation, such as X-rays, gamma photons or particles, in a wide range of different applications, including medical applications.

Basically, a radiation source generates a beam in the direction of an object to be examined and a detector measures the intensity of the beam after it has passed through the object. The detector outputs information required to produce an image representing attenuation of the radiation resulting from absorption and scattering by the object through which the beam traveled. Apart from forming a transmission image of an object a detector could also be used for measuring radiation doses.

Many radiation systems involve radiation sources, such as X-ray tubes or radiation treatment machines, associated with a very high MeV photon flow during the output pulse. The challenge is to convert as many as possible of the incident high energy photons, while at the same time preserving their spatial information, with a high precision. This makes it very difficult to achieve sufficient image quality.

A detector for detecting photons in the energy range 1 keV to 100 MeV is disclosed in [1]. The detector includes at least two converter layers adapted to interact with incident X-ray photons and to cause electrons to be emitted therefrom. At least one amplifier is adapted to interact with the emitted electrons and produce a multiplicity of secondary electrons and photons representing a signal proportional to the incident fluence of X-ray photons.

Document [2] is directed towards reducing spread of electrons as compared to conventional radiation detectors. The radiation detector comprises a gas electron multiplier (GEM) using interaction between radiation and gas through photoelectric effects. The GEM is arranged in a chamber filled with gas and has a single gas electron multiplication foil arranged in the chamber. This gas electron multiplication foil is made of a plate-like multilayer body composed by having a plate-like insulation layer made of a macromolecular polymer material having a thickness of 50-300 µm and flat metal layers overlaid on both surfaces of the insulation layer. The plate-like multilayer body is provided with a through-hole structure.

Document [3] discloses converter unit configured to convert incident photons into electrons. The converter unit comprises multiple blind holes forming respective ionization chambers. In additional embodiments, the converter unit is arranged in a detector, such as an X-ray detector or absolute radiation dose measurement detector, additionally comprising an electron amplification device and/or a readout device.

Document [4] discloses a detecting unit for detecting ionizing radiation. The detecting unit comprises a converter unit for the amplification of ionizing radiation and a read-out unit. The converter unit comprises a converter and a gas-electron multiplier. The converter comprises a substrate with an ionizing radiation-receiving major surface and an electron-emitting major surface and a stack of accelerator plates in contact with the electron-emitting major side. The stack comprises a plurality of perforated accelerator plates wherein the perforations of the perforated accelerator plates are aligned to form a matrix of blind holes.

SUMMARY

It is a general objective to provide a detector for two-dimensional imaging based on incident radiation.

It is a particular objective to provide such a detector with improved dosimetric precision.

An aspect of the embodiments relates to a detector comprising an ionization chamber, a detector chamber and a signal processor. The ionization chamber comprises a first electrode, a second electrode and an ionization chamber gas. The detector chamber comprises a converter unit adapted to convert incident radiation into electrons, an electron amplification device adapted to produce further electrons from the electrons, a read-out device adapted to generate a signal representative of the incident radiation and a detector chamber gas. The ionization chamber is arranged upstream of the detector chamber with regard to a direction of the incident radiation. The signal processor is adapted to generate a corrected signal by processing the signal representative of the incident radiation based on a current signal representative of an ionization current measured between the first electrode and the second electrode and induced by the incident radiation.

Another aspect of the embodiments relates to a method of generating an image frame based on incident radiation. The method comprises measuring an ionization current between a first electrode and a second electrode induced by the incident radiation. The first electrode and said second electrode are comprised in an ionization chamber comprising an ionization chamber gas. The method also comprises generating, by a read-out device, a signal representative of the incident radiation. The read-out device is comprised in a detector chamber comprising a converter unit adapted to convert incident radiation into electrons, an electron amplification device adapted to produce further electrons from the electrons, the read-out device and a detector chamber gas. The ionization chamber is arranged upstream of the detector chamber with regard to a direction of the incident radiation. The method further comprises generating a corrected signal by processing the signal representative of the incident radiation based on the current signal. The method additionally comprises generating the image frame based on the corrected signal.

The present detector has improved dosimetric precision allowing correction for, among others, non-linearities and sensitivity variations that may occur in the electron amplification device and/or read-out device of the detector. As a consequence, of this correction more accurate image frames of an irradiated object can be obtained.

BRIEF DESCRIPTION OF THE DRAWINGS

The embodiments, together with further objects and advantages thereof, may best be understood by making reference to the following description taken together with the accompanying drawings, in which:

FIG. 4 is a cross-sectional view of a converter unit according to another embodiment;

FIG. 5 is a cross-sectional view of a converter unit according to a further embodiment;

FIG. 6 is a cross-sectional view of a converter unit according to yet another embodiment;

FIG. 9 schematically illustrates an embodiment of sectored electrodes in the ionization chamber;

FIG. 10 schematically illustrates another embodiment of sectored electrodes in the ionization chamber;

FIG. 11 illustrates an embodiment of a sectored electron amplification device;

FIG. 12 illustrates another embodiment of a sectored electron amplification device;

DETAILED DESCRIPTION

Throughout the drawings, the same reference numbers are used for similar or corresponding elements.

The present embodiments generally relate to a detector for incident radiation and to a method of generating an image frame based on detected incident radiation.

The detector of the present embodiments is suitable for two-dimensional (2D) imaging, but may also be used for dosimetry. According to the embodiments, the precision of the detector is improved by the inclusion of an upstream ionization chamber, the output signal of which can be used to correct the output signal of a downstream detector chamber.

Figure 1:
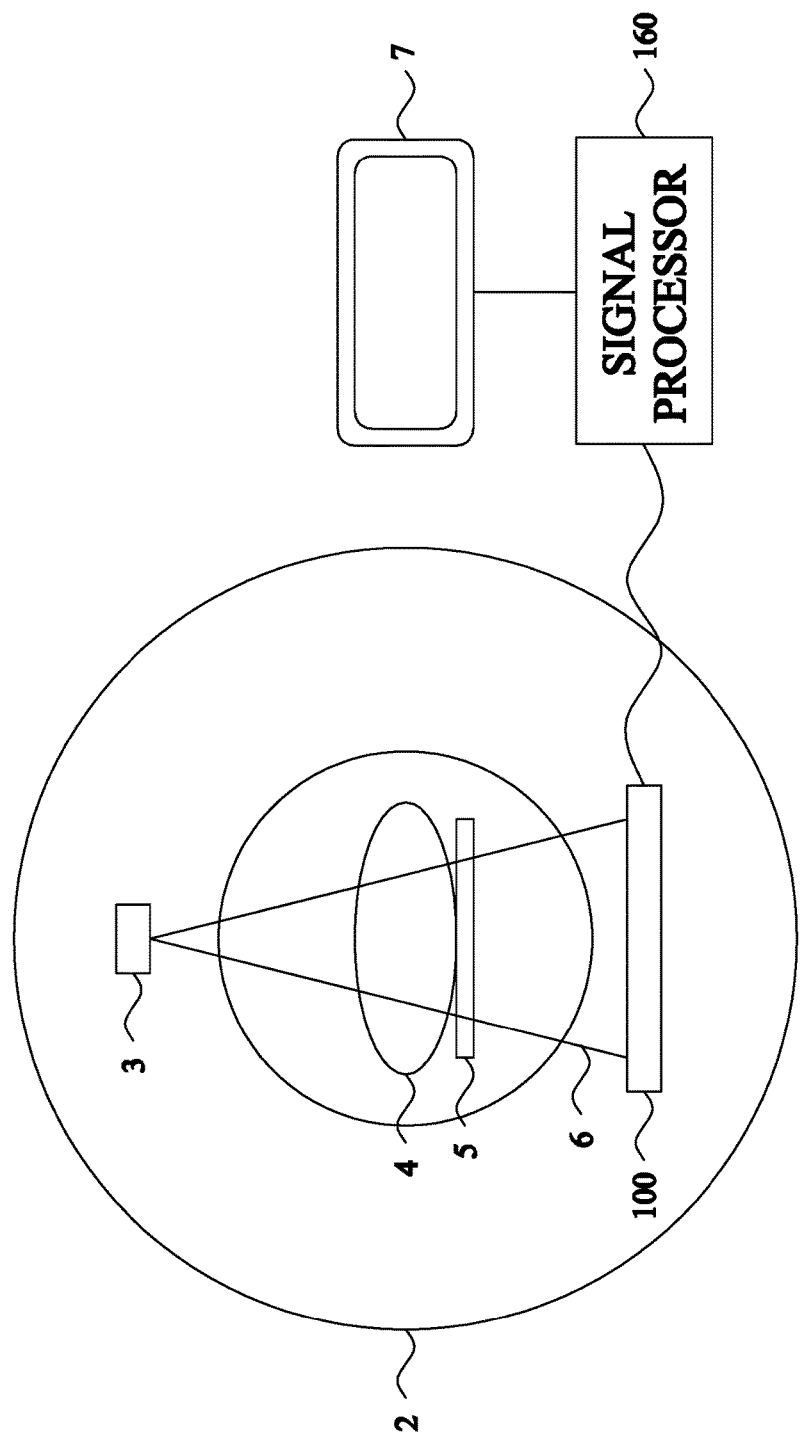
FIG. 1 is a schematic overview of a radiation system comprising a detector according to an embodiment.

FIG. 1 is a schematic overview of a radiation system comprising a detector 100 according to an embodiment. The radiation system comprises a gantry 2 comprising a radiation source 3 configured to generate and direct a beam 6 onto an object 4, such as a patient, positioned onto a couch 5. A downstream detector 100 measures the incident radiation having passed through at least a portion of the object 4 and outputs a signal representative of the incident radiation. The output signal is processed by a signal processor 160, such as constituting or forming part of a computer, to produce an image representing attenuation of the radiation resulting from absorption and scattering by the object 4 through which the beam 6 has traveled. Such an image can then be displayed on a screen 7.

The detector 100 of the embodiments may also be used for dosimetry measurements. In one such case, the beam 6 may be directed directly onto the detector 100 without passing through any object 4. Such dosimetry measurements may be used, for instance, in connection with machine quality assurance (QA) and/or during pre-treatment dose validation.

The detector 100 of the present embodiments is in particular suitable for detection of ionizing radiation. Non-limiting, but illustrative, examples of such ionizing radiation include X-ray, photons, alpha particles, beta particles, ions, protons, electrons and neutrons.

Figure 2:
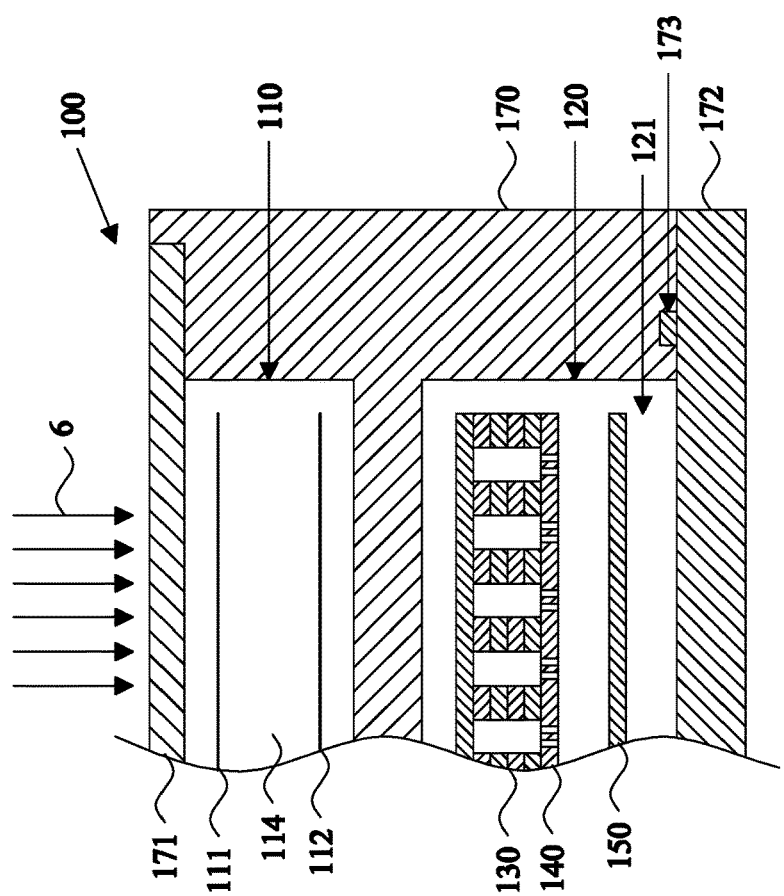
FIG. 2 is a cross-sectional view of a part of a detector according to an embodiment.

An aspect of the present invention therefore relates to a detector 100, see FIG. 2, comprising an ionization chamber 110 and a detector chamber 120. The ionization chamber 110 comprises a first electrode 111, a second electrode 112 and an ionization chamber gas 114. The detector chamber 120 comprises a converter unit 130 adapted to convert incident radiation 6 into electrons 8 (see FIGS. 3-6). The converter unit 130 also comprises an electron amplification device 140 adapted to produce further electrons 9 from the electrons 8 from the converter unit 130 (see FIG. 7). A read-out device 150 is arranged in the detector chamber 120 and is adapted to generate a signal representative of the incident radiation 6. The detector chamber 120 also comprises a detector chamber gas 121.

The ionization chamber 110 is arranged upstream of the detector chamber 120 with regard to a direction of the incident radiation 6.

The detector 100 also comprises a signal processor 160, see FIG. 1, adapted to generate a corrected signal by processing the signal representative of the incident radiation 6 based on a current signal representative of an ionization current measured between the first electrode 111 and the second electrode 112 and induced by the incident radiation 6.

Thus, the detector 100 comprises two respective chambers 110, 120, an upstream ionization chamber 110 and a downstream detector chamber 120. This means that the detector chamber 120 is complemented with an ionization chamber 110 adapted to generate a current signal representative of an ionization current measured between the electrodes 111, 112 and dependent on the incident radiation 6. This current signal is used in order to correct the signal generated by the detector chamber 120, and in more detail by the read-out device 150 of the detector chamber 120. The read-out device 150, thus, generates a signal based on detected electrons 9 from the electron amplification device 140 and where this signal is representative of the incident radiation 6. Then, a corrected signal is thereby obtained that more accurately represents the incident radiation 6 as compared to the uncorrected signal output by the read-out device 150.

This means that the current signal from the upstream disposed ionization chamber 110 can be used as a reference for the signal acquired with the detector chamber 120. Accordingly, very good corrections can be applied for any non-linearities in the dose response of the detector chamber 120. The ionization chamber 110 of the detector 110 is utilized to obtain a very accurate measure of the ionization radiation 6 passing through the ionization chamber volume. The ionization chamber 110 has a much lower energy and dose rate dependency as compared to the detector chamber 120. Accordingly, problems with non-linearities and sensitivity variations, such as caused by, for instance, saturation and/or charge-up effects in the detector chamber 120, in particular in the electron amplification device 140, can therefore be avoided or at least reduced by corrections of the signal output from the read-out device 150 by usage of the current signal.

The correction achievable by the current signal from the ionization chamber 110 thereby increases the accuracy of the detector 100 as compared to prior art detectors lacking any upstream ionization chamber 110.

Another advantage of arranging the ionization chamber 110 upstream of the detector chamber 120 is that the ionization chamber 110 can measure the full energy spectrum of the incident radiation 6, including lower energies. The converter unit 130 of the detector chamber 120 otherwise efficiently filters away much of that low energy radiation. Consequently, the ionization chamber 110 allows the detector 100 to also be used for absolute dosimetry, preferably in air, water or tissue, and for machine QA and/or pre-treatment dose validation.

Figure 14:
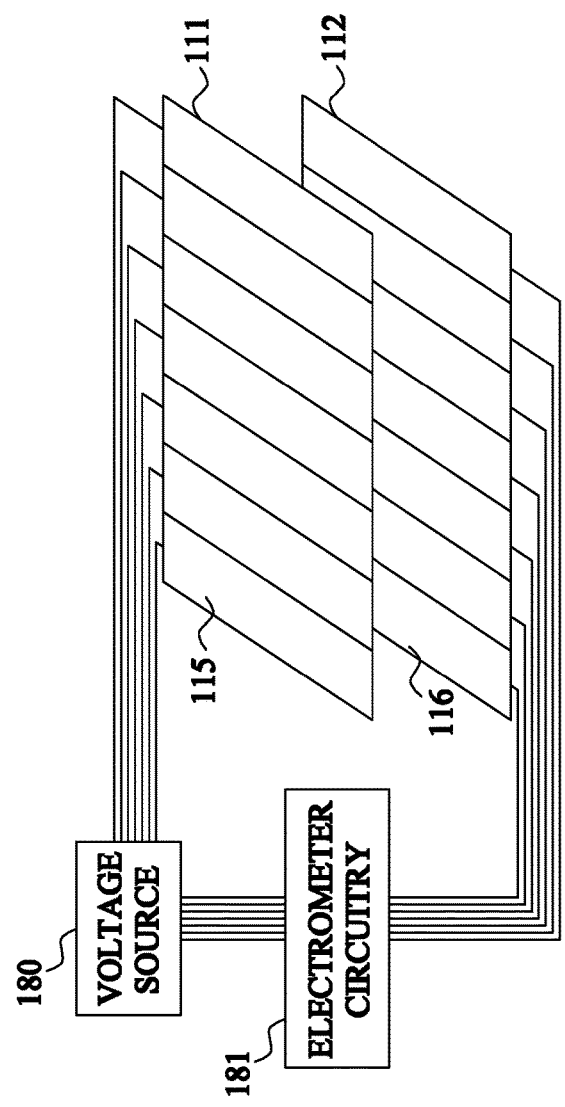
FIG. 14 schematically illustrates electrodes in the ionization chamber connected to a voltage source and electrometer circuitry according to an embodiment.
Figure 15:
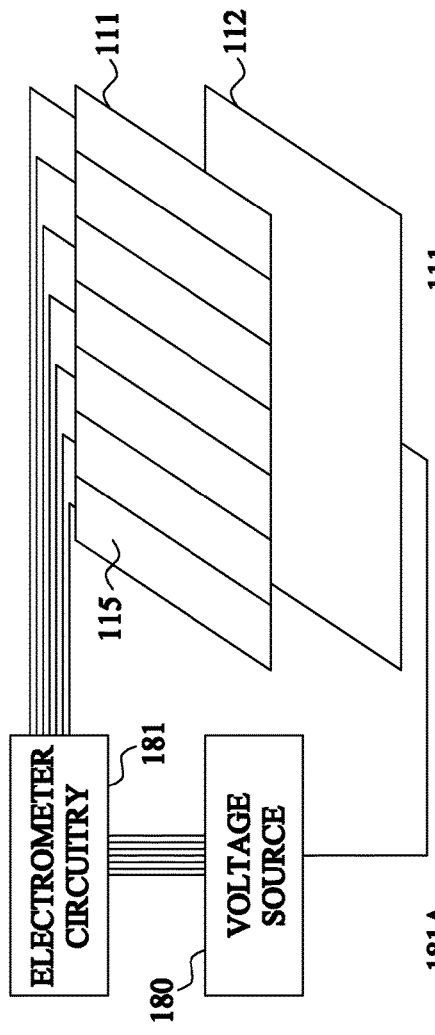
FIG. 15 schematically illustrates electrodes in the ionization chamber connected to a voltage source and electrometer circuitry according to another embodiment.
Figure 16:
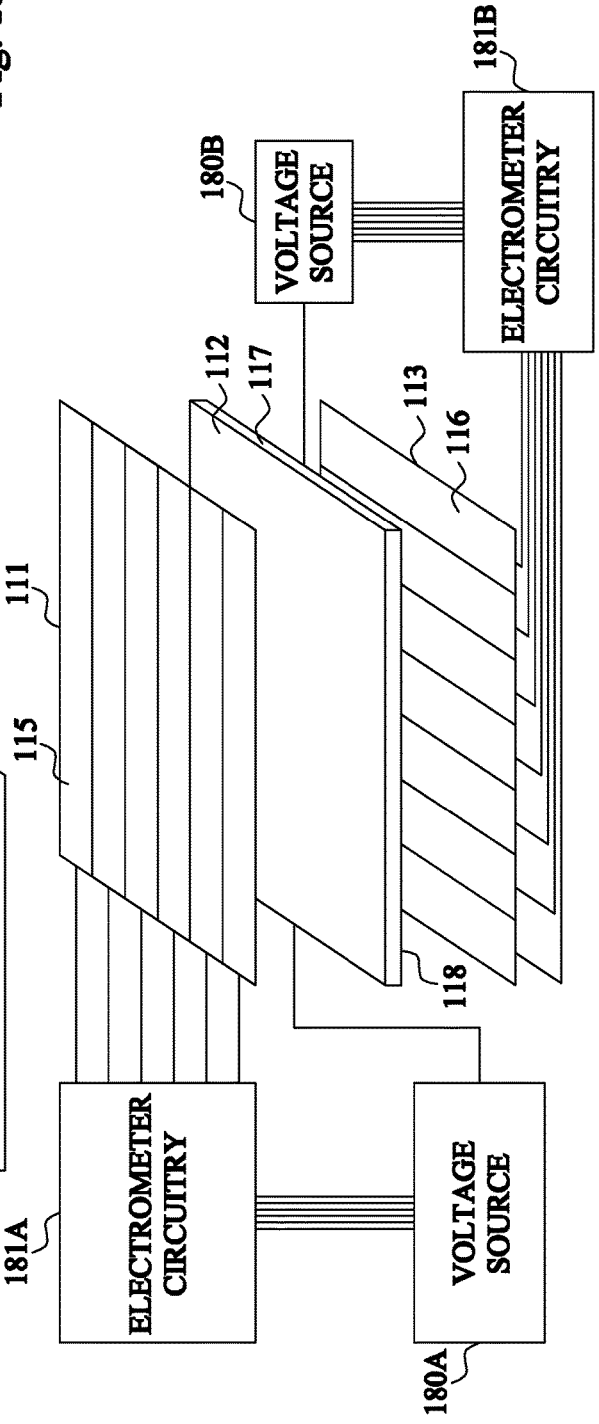
FIG. 16 schematically illustrates electrodes in the ionization chamber connected to a voltage source and electrometer circuitry according to a further embodiment.

In an embodiment, the detector 100 also comprises a voltage source 180 as illustrated in FIGS. 14 to 16. The voltage source 180 is adapted to apply a voltage potential between the first electrode 111 and the second electrode 112.

Thus, one of the electrodes 111, 112 in the ionization chamber 110 is connected to a potential, which could be a positive voltage or a negative voltage depending on decided direction of charge transport. The other electrode is preferably connected to an electrometer circuitry 181. The other electrode will thereby have its reference at a different potential.

The detector 100 comprises, in an embodiment, an electrometer circuitry 181 adapted to measure the ionization current between the first electrode 111 and the second electrode 112 and to generate the current signal. The current signal is thereby representative of the ionization current, which is in turn induced by the incident radiation. In an embodiment, the electrometer circuitry 181 is adapted to integrate the ionization current over a period of time in order to obtain an integrated charge value as a representative example of a current signal.

In an embodiment, a dedicated electrometer circuitry 181 could be included in the detector 100 for measuring the ionization current between the electrodes 111, 112. In another embodiment, circuitry in the read-out device 150 could be used instead of a dedicated electrometer circuitry 181. This circuitry includes amplifiers, the input of which operates as virtual ground, i.e., zero potential. This zero potential could thereby be connected to one of the electrodes 111, 112. An advantage of using such circuitry in the read-out device 150 also for the electrodes 111, 112 in the ionization chamber 110 is that the current signal will thereby automatically be included as a part of the signal output from the read-out device 150.

The first and second electrode 111, 112 are preferably made of a material selected from the group consisting of plastic coated with carbon, plastic coated with a metal, a metal alloy or a metal oxide, plastic coated with an electrically conductive polymer, carbon, a carbon coated metal, a metal alloy or metal oxide, a metal, a metal alloy, and a metal oxide. Non-limiting examples of plastics that can be used as substrate include polyimides, such as poly(4,4'-oxydiphenylene-pyromellitimide) also referred to as Kapton, polyethylene terephthalate (PET), and polyether ether ketone (PEEK). The metal is preferably selected from the group consisting of copper, gold, silver, iron and aluminum. Non-limiting examples of suitable metal oxides include indium tin oxide (ITO), indium zinc oxide (IZO), and aluminum zinc oxide (AZO). The electrically conductive polymer may be selected from poly(fluorene)s, polyphenylenes, polypyrenes, polyazulenes, polynaphtalenes, poly(pyrrole)s, polycarbazoles, polyindoles, polyazepines, polyanilines, poly(thiophene)s, poly(3,4-ethylenedioxytiophene), poly(p-phenylene sulfide), poly(acetylene)s, and poly(p-phenylene vinylene).

In an embodiment, the first and second electrode 111, 112 are made of an air equivalent material. In another embodiment, the first and second electrode 111, 112 are made of a water equivalent material. In a further embodiment, the first and second electrode 111, 112 are made of a tissue equivalent material.

The first electrode 111 is preferably a first plate electrode 111 and the second electrode 112 is preferably a second plate electrode 112 that is substantially parallel to the first plate electrode 111 as shown in FIGS. 14-16.

Hence, in a preferred embodiment the electrodes 111, 112 are in the form of plate electrodes 111, 112 forming a respective plate or sheet. Accordingly, the thickness of the plate electrodes 111, 112 is generally significantly smaller than the length and width of the plate electrodes 111, 112 as indicated in FIGS. 14-16.

In an embodiment, at least one of the first plate electrode 111 and the second plate electrode 112 comprises multiple electrically separated electrode sectors 115, 116. The electrically separated electrode sectors 115, 116 are electrically separated, i.e., electrically insulated, from each other. Accordingly, a voltage can be applied by the voltage source 180 between an electrically separated electrode sector 115 in one of the plate electrodes 111 and the other plate electrode 112 as shown in FIG. 15 or between aligned electrically separated electrode sectors 115, 116 in the two plate electrodes 111, 112 as shown in FIG. 14.

The multiple electrically separated electrode sectors 115, 116 could be obtained by applying a conducting coating onto an electrically insulating substrate and then removing conducting coating to form the electrically separated electrode sectors 115, 116. Alternatively, the conducting coating can be applied as separate sectors onto the electrically insulating substrate in order to obtain the electrically separated electrode sectors 115, 116.

The electrically separated electrode sectors 115, 116 could, in an embodiment, be implemented as electrode strips, electrode segments or electrode sectors.

As is shown in FIG. 15, one of the first plate electrode 111 and the second plate electrode 112 could have multiple electrically separated electrode sectors 115, whereas the other of the first plate electrode 111 and the second plate electrode 112 does not have any such electrically separated electrode sectors but rather a continuous plate electrode.

FIG. 14 illustrates another embodiment in which the first plate electrode 111 comprises multiple first electrically separated electrode sectors 115 and the second plate electrode 112 comprises multiple second electrically separated electrode sectors 116.

In such a case, at least a portion of the multiple first electrically separated electrode sectors 115 is preferably aligned with at least a portion of the multiple second electrically separated electrode sectors 116 to form pairs of aligned first and second electrode sectors 115, 116.

This means that first and second electrode sectors 115, 116 in the two plate electrodes 111, 112 are preferably aligned with each other with regard to the direction of the incident radiation 6 through the ionization chamber 110. Furthermore, the first and second electrode sectors 115, 116 are preferably not only aligned with each other but preferably also matched in size, i.e., preferably have the same size in terms of length and width. A first electrically separated electrode sector 115 in the first plate electrode 111 then forms a so-called pair of aligned first and second electrode sectors 115, 116 with its aligned second electrically separated electrode sector 116 in the second plate electrode 112.

In an embodiment, all first electrically separated electrode sectors 115 are aligned with a respective second electrically separated electrode sector 116 as shown in FIG. 14. In another embodiment, merely a portion thereof are aligned to form the above mentioned pairs of first and second electrode sectors 115, 116. In this latter embodiment, the alignment is preferably between central first electrically separated electrode sectors 115 and central second electrically separated electrode sectors 116. This means that the pairs of aligned first and second electrode sectors 115, 116 are present in the central part of the plate electrodes 111, 112, whereas peripheral electrode sectors in the two plate electrodes 111, 112 do not necessarily have to be aligned with each other. The reason for such central alignment is that most of the incident radiation 6 having passed through the object 4 will fall onto the central part of the plate electrodes 111, 112, whereas the peripheral parts of the plate electrodes 111, 112 will experience less incident radiation 6. This means that the central part of the plate electrodes 111, 112 could be regarded as being more important in terms of correcting the signal output by the read-out device 150 since the part of the signal that corresponds to the central part of the plate electrodes 111, 112 but also of the converter 130, electron amplification device 140 and the read-out device 150 carries the most relevant image information.

FIGS. 9 and 10 illustrate two embodiments of different sectorization of plate electrodes 111, 112 into electrically separated electrode sectors 115, 116. In FIG. 10, the electrically separated electrode sectors 115, 116 extend from one end side of the plate electrode 111, 112 to another, opposite end side of the plate electrode 111, 112. Hence, the electrically separated electrode sectors 115, 116 preferably extend over substantially the whole length or width of the plate electrodes 111, 112. This approach results in columns or rows of electrically separated electrode sectors 115, 116. FIG. 9 illustrates another approach in which the electrically separated electrode sectors 115, 116 not necessary have to extend over the whole length or width of the plate electrodes 111, 112. In clear contrast, multiple, such as two, electrically separated electrode sectors 115, 116 are arranged along the path from the one end side of the plate electrode 111, 112 to the other, opposite end side of the plate electrode 111, 112. In such a case, preferably two electrically separated electrode sectors 115, 116 are provided in each column or row since this simplifies electrical connection of the electrically separated electrode sectors 115, 116 to the voltage source 180 and the electrometer circuitry 181. However, it is possible to have more than two electrically separated electrode sectors 115, 116 per column or row. The embodiment shown in FIG. 9 thereby forms a matrix of electrically separated electrode sectors 115, 116, whereas the embodiment shown in FIG. 10 could be regarded as an array of electrically separated electrode sectors 115, 116.

It is also possible to have one plate electrode with a matrix of electrically separated electrode sectors 115, 116, such as in FIG. 9, together with another plate electrode with an array of electrically separated electrode sections 115, 116, such as in FIG. 10.

Aligning first and second electrically separated electrode sectors 115, 116 is a preferred embodiment. However, it is also possible to have the first and second electrically separated electrode sectors 115, 116 angled relative to each other. FIG. 16 schematically illustrates this approach in which electrically separated electrode sectors 115 in the top plate electrode 111 extend in one direction, whereas electrically separated electrode sectors 116 in the bottom plate electrode 113 extend in another direction that is, in this example, perpendicular to the extension direction of the electrically separated electrode sectors 115 in the plate electrode 111.

The extension direction of electrically separated electrode sectors 115, 116 as used herein corresponds to the direction or axis of the longest dimension of the electrically separated electrode sectors 115, 116. An angle between such extension directions is then the angle between the direction or axis of the longest dimension of the first electrically separated electrode sectors 115 and the direction or axis of the longest dimension of the second electrically separated electrode sectors 116. This angle could range from 0° as in FIG. 14, in which the first and second electrically separated electrode sectors 115, 116 are aligned, up to 90° as in FIG. 16, in which the first and second electrically separated electrode sectors 115, 116 are perpendicular to each other. In the case of a non-zero angle between first and second electrically separated electrode sectors 115, 116, this non-zero angle is most preferably 90°.

The ionization chamber 110 may comprise more than two electrodes 111, 112, 113, 118, such as more than two substantially parallel plate electrodes 111, 112, 113, 118. In such a case, none, one, two or more, including all, plate electrodes 111, 113 could comprise multiple electrically separated electrode sectors 115, 116. The multiple electrically separated electrode sectors 115, 116 could be aligned or angled relative to each other with a non-zero angle, such as 90°.

Hence, in an embodiment the ionization chamber 110 comprises N plate electrodes 111, 112, 113, 118 substantially parallel to each other. In this embodiment, N is an integer equal to or larger than 3.

In an embodiment, at least two plate electrodes 111, 113 of the N plate electrodes 111, 112, 113, 118 comprises multiple electrically separated electrode sectors 115, 116.

FIG. 16 illustrates an embodiment comprising four plate electrodes 111, 112, 113, 118. This approach basically corresponds to having two ionization chambers with an upstream ionization chamber comprising the top plate electrode 111 and the bottom plate electrode 112 and a downstream ionization chamber comprising the top plate electrode 118 and the bottom plate electrode 113.

In the embodiment illustrated in FIG. 16, the bottom plate electrode 112 of the upstream ionization chamber and the top plate electrode 118 of the downstream ionization chamber are implemented as electrode plates, layers or coatings onto opposite main sides of an intermediate insulating substrate 117. This should, however, merely be seen as an illustrative example. In other embodiments, the two plate electrodes 112, 118 could be in the form of two separate plate electrodes with a gas gap in between. A further variant is to use a common plate electrode that constitutes both bottom plate electrode for the upstream ionization chamber and top plate electrode for the downstream ionization chamber.

In the figure, a respective voltage source 180A, 180B and electrometer circuitry 181A, 181B are provided for each ionization chamber. It is also possible to use a single voltage source for both ionization chambers and/or a single electrometer circuitry for both ionization chambers.

In alternative embodiments of the ionization chamber, the top plate electrode 111 of the top ionization chamber is sectored or non-sectored and the bottom plate electrode 112 of the top ionization chamber is sectored or non-sectored. If both plate electrodes 111, 112 of the top ionization chamber are sectored, the electrically separated electrode sectors 115 may be aligned to each other or angled with a non-zero angle, preferably 90°, relative to each other. In addition, the top plate electrode 118 of the bottom ionization chamber may be sectored or non-sectored and the bottom plate electrode 113 of the bottom ionization chamber may be sectored or non-sectored. If both plate electrodes 118, 113 of the bottom ionization chamber are sectored, the electrically separated electrode sectors 116 may be aligned to each other or angled with a non-zero angle, preferably 90°, relative to each other.

Hence, these various embodiments include non-sectored top plate electrode 111, non-sectored bottom plate electrode 112, non-sectored top plate electrode 118 and non-sectored bottom plate electrode 113; sectored top plate electrode 111, non-sectored bottom plate electrode 112, non-sectored top plate electrode 118 and non-sectored bottom plate electrode 113; non-sectored top plate electrode 111, sectored bottom plate electrode 112, non-sectored top plate electrode 118 and non-sectored bottom plate electrode 113; non-sectored top plate electrode 111, non-sectored bottom plate electrode 112, sectored top plate electrode 118 and non-sectored bottom plate electrode 113; non-sectored top plate electrode 111, non-sectored bottom plate electrode 112, non-sectored top plate electrode 118 and sectored bottom plate electrode 113; sectored top plate electrode 111, sectored bottom plate electrode 112, non-sectored top plate electrode 118 and non-sectored bottom plate electrode 113; sectored top plate electrode 111, non-sectored bottom plate electrode 112, sectored top plate electrode 118 and non-sectored bottom plate electrode 113; sectored top plate electrode 111, non-sectored bottom plate electrode 112, non-sectored top plate electrode 118 and sectored bottom plate electrode 113; non-sectored top plate electrode 111, sectored bottom plate electrode 112, sectored top plate electrode 118 and non-sectored bottom plate electrode 113; non-sectored top plate electrode 111, sectored bottom plate electrode 112, non-sectored top plate electrode 118 and sectored bottom plate electrode 113; non-sectored top plate electrode 111, non-sectored bottom plate electrode 112, sectored top plate electrode 118 and sectored bottom plate electrode 113; sectored top plate electrode 111, sectored bottom plate electrode 112, sectored top plate electrode 118 and non-sectored bottom plate electrode 113; sectored top plate electrode 111, sectored bottom plate electrode 112, non-sectored top plate electrode 118 and sectored bottom plate electrode 113; sectored top plate electrode 111, non-sectored bottom plate electrode 112, sectored top plate electrode 118 and sectored bottom plate electrode 113; non-sectored top plate electrode 111, sectored bottom plate electrode 112, sectored top plate electrode 118 and sectored bottom plate electrode 113; and sectored top plate electrode 111, sectored bottom plate electrode 112, sectored top plate electrode 118 and sectored bottom plate electrode 113.

Hence, in an embodiment the ionization chamber comprises a top ionization chamber comprising the first electrode 111 and the second electrode 112, and a downstream bottom ionization chamber comprising a third electrode 118 and a fourth electrode 113.

In an embodiment, the second electrode 112 is in the form of an electrically conductive layer arranged on a first main side of an intermediate insulating substrate 117 and the third electrode 118 is in the form an electrically conductive layer arranged on a second, opposite main side of the intermediate insulating substrate 117.

This concept of having multiple plate electrodes 111, 112, 113, 118, such as in the form of multiple ionization chambers, could be extended with even more plate electrodes and ionization chambers.

In an embodiment, at least a portion of the multiple electrically separated electrode sectors 115 in one of the at least two plate electrodes 111, 113 is aligned with at least a portion of the multiple electrically separated electrode sectors 116 in another of the at least two plate electrodes 111, 113.

In an alternative, or additional embodiment, the multiple electrically separated electrode sectors 115 in one of the at least two plate electrodes 111, 113 are angled with a non-zero angle relative to the multiple electrically separated electrode sectors 116 in another of the at least two plate electrodes 111, 113.

Having both aligned and angled electrode sectors 115, 116 could be possible if, for instance, the plate electrode 112 in FIG. 16 had the same type of sectorization as the plate electrode 111 or the plate electrode 118 in FIG. 16 had the same type of sectorization as the plate electrode 113.

As previously mentioned herein, the detector 100 preferably comprises an electrometer circuitry 181. In such a case, the electrometer circuitry 181 can be adapted to measure, for each pair of aligned first and second electrode sectors 115, 116, an ionization current between the pair of aligned first and second electrode sectors 115, 116 and generate a current signal representative of the measured ionization current.

The sectorization of the plate electrodes 111, 112, or a portion thereof, in the ionization chamber 110 implies that coarse spatial information can be acquired from the ionization chamber 110. In other words, separate current signals from different sectors or parts of the plate electrodes 111, 112 can thereby be measured as compared to a single current signal for the case with non-sectored plate electrodes 111, 112. The sectorization allows for a more flexible correction approach since in some embodiments, there exist non-linear responses in the detector chamber 120 as function of the local radiation flux as well as of the locally accumulated dose in the read-out device 150. Accordingly, the sensitivity of the electron amplification device 140 and/or the read-out device 150 may vary over different parts of the detection area. Typical examples would be the use of a scanned beam spot, a small irradiation field or imaging of attenuating objects 4, which partly cover the detector area. If the radiation flux and/or accumulated dose vary considerably between different detector areas, it would be more beneficial to apply different correction factors to these different detection areas. Dividing at least one of the plate electrodes 111, 112 into electrically separated sectors 115, 116 enables generation of current signals for different areas and thereby calculation of different correction factors for the different sectors 115, 116 and the matching or corresponding detection areas. Generally, the smaller the area of the electrically separated sectors 115, 116 the better resolution in the calculation of correction factors and thereby the better correction of the signal output from the read-out device 150. Thus, a smaller sector area enables a more accurate adaptation and correction to local differences in the incident radiation 6.

In an embodiment, the signal processor 160 is adapted to calculate a correction factor based on the signal representative of the incident radiation 6 and the current signal. The signal processor 160 is preferably also adapted to generate the corrected signal based on the signal representative of the incident radiation 6 and the correction factor.

Hence, in this embodiment the signal processor 160 generates a correction factor CF based on the signal P from the read-out device 150 and the current signal i, i.e., CF=ƒ(P,i) for some function ƒ( ). The correction factor CF is then used by the signal processor 160 to generate the corrected signal $P_{corr}$ from the signal P, i.e., $P_{corr}$=g(P,CF) for some function g( ).

As mentioned in the foregoing, in the case of sectored plate electrodes 111, 112, a respective correction factor CF could be calculated for each sectors. In such a case, i above preferably represents the current signal measured for the relevant electrically separated electrode sector 115, 116, such as for a pair of aligned first and second electrode sectors 115, 116. The signal P then preferably represents the signal from the portion of the read-out device 150 corresponding to and aligned with the electrically separated electrode sector 115, 116 or pair of aligned first and second electrode sectors 115, 116.

Figure 7:
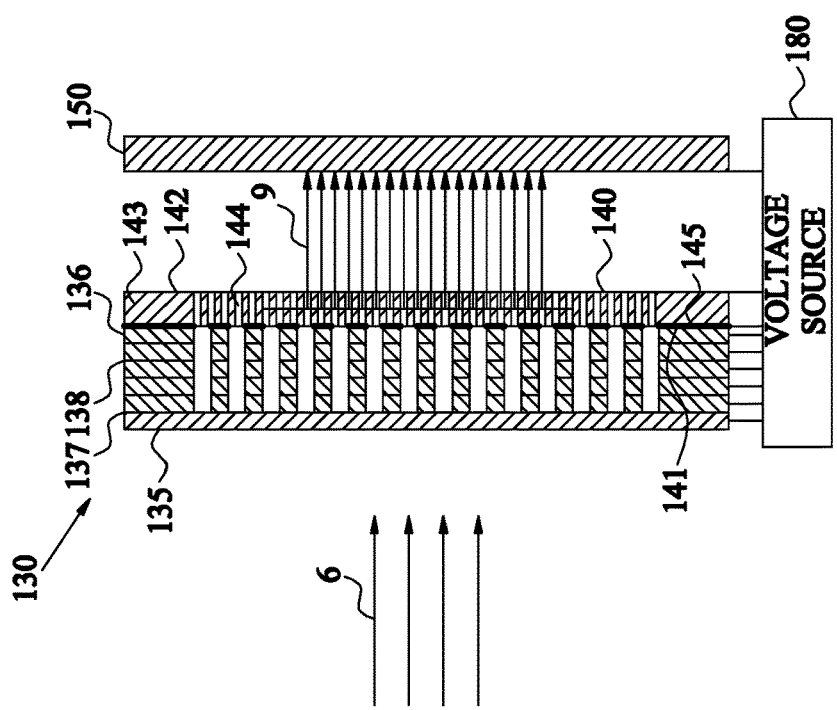
FIG. 7 is a cross-sectional view of a converter unit, electron amplification device and read-out device according to an embodiment.

The electron amplification device 140 preferably comprises, see FIG. 7, an intermediate insulation layer 143, a first electrode layer 141 arranged on a first main side of the intermediate insulation layer 143 and a second electrode 142 arranged on a second, opposite main side of the intermediate insulation layer 143. Furthermore, multiple through holes 144 extends through a whole thickness of the electron amplification device 140.

There are various implementation examples of electron amplification devices 140 that can be used in a detector 100 in order to amplify an input electron signal, i.e., electrons 8 from the converter unit 130, and output an amplified electron signal, i.e., further elections 9. A preferred example is a Gas Electron Multiplier (GEM).

A GEM 140 is, in its most basic design, a thin structure of two metal electrodes 141, 142, with an insulating foil 143 inserted between. The structure is perforated with through holes 144 where the electron multiplication can occur. In a preferred embodiment, a voltage source 180 is connected to the two metal electrodes 141, 142 of the GEM 140 and is adapted to apply a voltage across the metal electrodes 141, 142. This applied voltage will create large electric fields in the through holes 144.

GEMs 140 are well known in the art and there are various documents disclosing GEM examples [1, 2, 5, 6].

In some prior art detectors, a stack of multiple GEMs 140 could be used to even further amplify the electron signal. Such an approach is also possible for a detector 100 of the embodiments. In such a case, the multiple GEMs 140 could be separated from each other by a respective electrically insulating layer. Alternatively, a small gas gap could be present between adjacent GEMs 140.

Other non-limiting examples of electron amplification devices 140 that can be used in the detector 100 include Micro Channel Plate (MCP), Capillary Plate (CP) and Micro-Mesh Gaseous Structure (MicroMegas).

Generally, a MCP is a slab made from highly resistive material with a regular array of tubes or slots (microchannels) leading from one face to the opposite. These tubes or slots are typically densely distributed over the whole structure. In operation, each microchannel is a continuous-dynode electron multiplier, in which multiplication of electrons takes place under the presence of a strong electric field. An electron, photon or particle entering a microchannel through a small orifice is guaranteed to hit the channel wall since the microchannels are angled to the plate and, thus, angled relative to the angle of impact. The impact between the electron, photon or particle and the channel wall starts a cascade of electrons that propagate through the microchannel. Accordingly, an amplification of the original signal by several orders of magnitude is possible depending on the electric field strength and the geometry of the MCP.

There are variants of MCP in the art that can also be used according to the embodiments, such as chevron MCP and Z stack MCP.

An example of a MCP design is disclosed in a document [7].

A CP is basically a thin plate-like member, in which a plurality of lead glass capillaries constituting a hollow-like shape is integrated. Thin film electrodes are formed on opposite surfaces of the CP. More information of CP design can be found in a document [8].

In a MicroMegas a gas volume is divided in two by a metallic micro-mesh. An electron or photon passing through the MicroMegas will ionize gas atoms by pulling up an electron creating an electron-ion pair. By applying an electric field the electron will drift toward the micro-mesh operating as amplification electrode. When the electron enters close to the micro-mesh it enters an intense electric field. Accelerated by this high electric field, the electron reaches enough energy to produce electron-ion pairs that will also ionize the gas causing an avalanche effect.

In an embodiment, at least one of the first electrode layer 141 and the second electrode layer 142 of the electron amplification device 140 comprises multiple electrically separated electrode layer sectors 146 as shown in FIGS. 11 and 12.

The discussion presented above with regard to sectorizing plate electrodes 111, 112 in the ionization chamber 110 can also be applied to the sectorization of the electrode layers 141, 142 in the electron amplification device 140. For instance, one of the electrode layers 141, 142 or both of the electrode layers 141, 142 could be divided into multiple electrically separated electrode layer sectors 146. In the latter case, so called first electrically separated electrode layer sectors 146 of the first electrode layer 141 could then be aligned with, and preferably of a same size as, so called second electrically separated electrode layer sectors 146 of the second electrode layer 142. Alternatively, the electrically separated electrode layer sectors 146 in the two electrode layers 141, 142 could be angled relative to each other.

The sectorization of the first and/or second electrode layer 141, 142 could be in the form of an array of electrically separated electrode layer sectors 146 as shown in FIG. 12 or a matrix of electrically separated electrode layer sectors 146 as shown in FIG. 11.

In either case, the through holes 144 in the electron amplification device 140 are preferably present in the portions of the electron amplification device 140 corresponding to the electrically separated electrode layer sectors 146 as indicated in FIGS. 11 and 12 rather than in between adjacent electrically separated electrode layer sectors 146.

In a particular embodiment, the first electrode layer 141 comprises multiple first electrically separated electrode layer sectors 146 and the second electrode layer 142 comprises multiple second electrically separated electrode layer sectors 146. In such a case, at least a portion of the multiple first electrically separated electrode layer sectors 146 is preferably aligned with at least a portion of the multiple second electrically separated electrode layer sectors 146 to form pairs of aligned first and second electrode layer sectors 146.

As with the plate electrodes 111, 112 in the ionization chamber 110 all of the first and second electrically separated electrode layer sectors 146 could be aligned to form pairs of aligned first and second electrode layer sectors 146, or only a portion thereof are aligned to form the pairs.

In an embodiment, at least a portion of the pairs of aligned first and second electrode sectors 115, 116 is aligned with at least a portion of the pairs of aligned first and second electrode layer sectors 146.

In an embodiment, the first and/or second electrically separated electrode sectors 115, 116 could have a same size as the first and/or second electrically separated electrode layer sectors 146. For instance, first and/or second plate electrodes 111, 112 as shown in FIG. 9 (or FIG. 10) could be used together with an electron amplification device 140 having first and/or second electrode layer 141, 142 as shown in FIG. 11 (or FIG. 12). This approach could be preferred since it simplifies calculation of the correction factors. However, it is possible to have different sizes of the first and/or second electrically separated electrode sectors 115, 116 as compared to the first and/or second electrically separated electrode layer sectors 146. For instance, a first and/or second plate electrode 111, 112 according to FIG. 9 (or FIG. 10) could be used together with an electron amplification device 140 having first and/or second electrode layer 141, 146 according to FIG. 12 (or FIG. 11).

It is also possible to have the pairs of first and second electrode layer sectors 146 angled with a non-zero angle relative to the pairs of first and second electrode sectors 115, 116.

Figure 13:
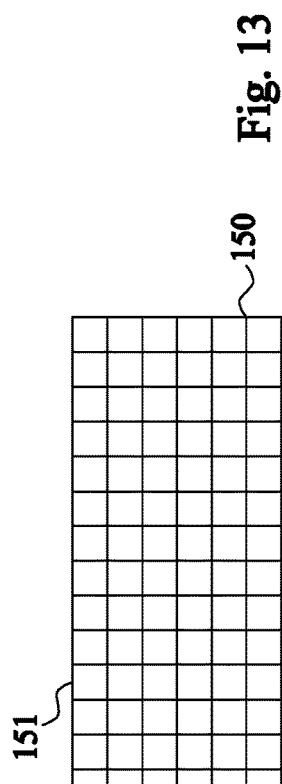
FIG. 13 illustrates an embodiment of a pixelated read-out device.

In an embodiment, the read-out device 150 is a pixelated read-out device 150 comprising multiple pixels 151, see FIG. 13. In such a case, each pixel 151 of the multiple pixels 151 is preferably adapted to generate a signal representative of incident radiation detected at the pixel 151.

The signal processor 160 is then preferably adapted to generate, for each pixel 151 of the multiple pixels 151, a corrected signal by processing the signal representative of incident radiation, detected at the pixel 151, based on a current signal representative of an ionization current measured between a pair of aligned electrically separated electrode sectors 115, 116 in the first plate electrode 111 and the second plate electrode 112 or between an electrically separated electrode sector 115 in one of the first plate electrode 111 and the second plate electrode 112 and the other of the first plate electrode 111 and the second plate electrode 112. The pixel 151 is then comprised in an area of the read-out device 150, and where this area is aligned with the pair of aligned electrically separated electrode sectors 115, 116 or the electrically separated electrode sector 115.

In other words, the signal representative of incident radiation detected at a pixel 151 is corrected based on a current signal as measured between aligned electrode sectors 115, 116 or between one electrode sector 115 and a non-sectored plate electrode 112. The pixel 151 is then comprised in an area or portion of the read-out device 150 that is aligned with the pair or aligned electrode sectors 115, 116 or the one electrode sector 115 in the ionization chamber 110.

Generally, an electrically separated electrode sector 115, 116 in the plate electrodes 112, 116 is larger than a pixel 151 in the read-out device 150. This means that an electrically separate electrode sector 115, 116 could have a size corresponding to an area with multiple pixels 151 in the read-out device 150, such as having a size of m×n pixels. For instance, assume that (a,b) is a position of a first pixel in the area of the pixelated read-out device 150 aligned with the pair of aligned first and second electrode sectors 115, 116 or aligned with one first electrode sector 115 and/or one second electrode sector 116 and the size of this area is m×n pixels. Then the pixels (a,b) to (a+m−1, b+n−1) in the read-out device 150 are aligned with the pair of first and second electrode sectors 115, 116 or aligned with the first and/or second electrode sector 115, 116.

The current signal obtained based on measurements between first and second electrode sectors 115, 116 or between an electrode sector 115 and a non-sectored plate electrode 112 is then the same for all pixels (a,b) to (a+m−1, b+n−1) in the read-out device 150. This does not necessarily mean that the same correction factor CF is calculated for all of these pixels 151 since the correction factor CF is also based on the signal representative incident radiation detected at a pixel 151. However, in an embodiment a single correction factor CF is calculated for all pixels (a,b) to (a+m−1, b+n−1) in the read-out device 150 as it simplifies the calculations. Please, though, note that this correction factor may be different for different areas of pixels 151 in the read-out device 150 since these different areas are aligned with different pairs of electrode sectors 115, 116 or different first and/or second electrode sectors 115, 116, which may generate different current signals.

In an embodiment, the signal processor 160 is adapted to calculate, for a pixel 151 at position (x,y) of the multiple pixels 151, a correction factor CF based on $$k \times \frac{\sum_{x=a}^{a+m-1} \sum_{y=b}^{b+n-1} P(x, y)}{\int_{t_1}^{t_2} i \, dt} \quad (1)$$

In the equation (1) above, k is a scale factor, P(x,y) is a pixel value for the pixel 151 at position (x,y) in the pixelated read-out device 150 and corresponding to the signal representative of the incident radiation 6, (a,b) is a position of a first pixel in the area of the pixelated read-out device 150 aligned with the pair of aligned electrically separated electrode sectors 115, 116 or the electrically separated electrode sector 115, m×n is a size of the area in number of pixels, i is an ionization current measured over the pair of aligned electrically separated electrode sectors 115, 116 or the electrically separated electrode sector 115 and the other of the first plate electrode 111 and the second plate electrode 112, $t_1$ is a start time for an image frame of the pixelated read-out device 150 and $t_2$ is an end time for the image frame.

The signal processor 160 is preferably adapted to generate a corrected pixel value $P_{corr}(x,y)$ for the pixel 151 at position (x,y) corresponding to the corrected signal as $P_{corr}(x,y)=CF \times P(x,y)$.

The profile formed by the signal values or amplitudes from each electrically separated sector 115, 116 represents a one-dimensional distribution of the accumulated dose in the direction of the electrically separated sectors 115, 116 in the plate electrodes 111, 112. If multiple ionization chambers are used as shown in FIG. 16, with electrically separated sectors 115, 116 angled relative to each other, multiple such projected signal profiles can be formed. In such a case, for instance tomography reconstruction methods [10], e.g., filtered back projection, can be applied to the signal profiles in order to compute a two-dimensional dose distribution. This two-dimensional dose distribution can then be used to compute correction factors that can be applied to signal values from corresponding areas in the downstream pixelated read-out device 150.

In an embodiment, by sectorizing at least one plate electrode 111, 112 of the ionization chamber 110, also coarse spatial information can be acquired, allowing matching of sub-areas with the image from the pixelated read-out device 150. This sectorization allows for a more flexible correction approach, since in some embodiments of pixelated read-out devices 150, there exist non-linear responses as function of the local radiation flux as well as of the locally accumulated dose, i.e., the pixelated detector sensitivity will vary over different parts of the detection area. Typical examples would be the use of a scanned beam spot, a small irradiation field or imaging of attenuating objects, which partly cover the detector area. If the radiation flux and/or the accumulated dose vary considerably between different areas of the detector, it will be beneficial to apply different correction factors to these different areas. The sectorization could be implemented as strips or sectors 115, 116. In such a case, an individual amplifier channel is preferably used per electrode strip or sector 115, 116.

In an embodiment, the strips or sectors 115, 116 are matching in size and alignment with the strips or sectors 146 of the electron amplification device 140, e.g., GEM foil sectors 146. This is advantageous since major sources of non-linearities and time dependent behaviors in the pixelated detector are the dose-rate (radiation flux) dependence and accumulated dose dependence of the electron amplification device 140.

The ionization chamber 110 is preferably calibrated using conventional methods, e.g., using reference radionuclide sources or by comparison to calibrated and approved reference dosimeters. Once the ionization chamber 110 has been calibrated, it is possible to obtain a very accurate measure of the ionization radiation passing through the ionization chamber volume at each strip or sector 115, 116, or indeed the complete electrode surface 111, 112 if no sectorization is done. Such an ionization chamber 110 has much lower energy and dose rate dependency as compared to the downstream pixelated read-out device 150 in the detector chamber 120. Accordingly, problems with non-linearities and sensitivity variations caused by e.g., saturation and/or charging charge-up effects, can be avoided or at least reduced. For instance, the GEM-based electron amplification 140 is changing when the Kapton foil 143 of the GEM is charged by electrons. Furthermore, in some embodiments, a respective protection resistance is connected to each electrically separated electrode layer sector 146 in the electron amplification device 140. Such protection resistances are included to protect against discharges that may occur during operation of the electron amplification device 140. However, the protection resistances may induce limitations in the current supply, thereby causing different amplifications in different electrically separated electrode layer sectors 146. Also different saturation effects may occur in different through holes 144 of the electron amplification device 140. The detector 100 of the embodiments may also correct for such effects that may otherwise occur in the electron amplification device 140 and would negatively affect the output signal from the read-out device 150.

In an embodiment, summing the integrated signals for each pixel 151, during a given integration time period $(t_2-t_1)$, the detector signal from all pixels 151 in the pixelated read-out device 150 corresponding to the surface of a sector or strip 115, 116 in the ionization chamber 110, it is possible to obtain a relationship between that sum and the current (charge) being integrated during the same given integration time period in the corresponding sector or strip 115, 116 in the ionization chamber 110. The relationship thereby represents a quotient between a signal from a given area in the ionization chamber 110 and a signal from the corresponding area in the detector chamber 120.

The relationship would in an ideal situation be constant. However, due to drift of the electron amplification device 140 this relationship will not be constant. The relationship can be used to compensate for such variations and electron amplification device drift to thereby obtain a more accurate pixelated image signal from the pixelated read-out device 150.

The correction given by equation (1) is preferably repeated for each pixel 151 in the read-out device 150 sector by sector.

The converter unit 130 of the detector 100 can be implemented according to various embodiments as shown in FIGS. 3-6.

Figure 3:
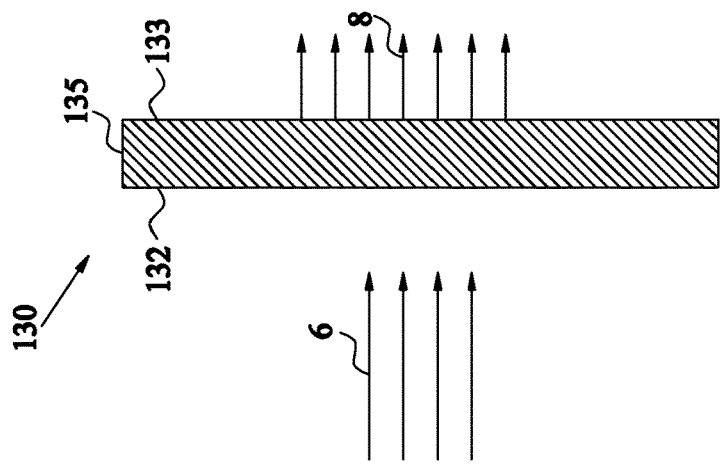
FIG. 3 is a cross-sectional view of a converter unit according to an embodiment.

In a first embodiment, the converter unit 130 comprises a solid converter plate 135 as shown in FIG. 3. The incident radiation 6 having passed through the ionization chamber 110 strikes a first main side 132 of the solid converter plate 135 causing electron conversion and the release of electrons 8 from a second, opposite main side 133 of the solid converter plate 135.

Generally, there is a big challenge to convert as many as possible of incident high energy photons or particles, while at the same time preserving their spatial information, with a high precision. In such a case, it could be possible to arrange several separate solid converter plates 135 in the converter unit 130. However, such an approach generally leads to low sharpness in the formed picture due to open gas layers between the converter plates 135, causing scattering and lateral electron distribution. This in turn leads to blurriness in the captured image.

FIGS. 4-6 illustrate a radically different approach when constructing the converter unit 130. In these embodiments, the converter unit 130 comprises multiple blind holes 134, sometimes referred to as bottom holes, forming respective ionization chambers in the converter unit 130.

This means that the blind holes 134 in the converter unit 130 extend through a portion L, see FIG. 4, of a thickness T of the converter unit 130 but do not extend through the whole thickness T of the converter unit 130. This means that there is a portion W of the thickness T of the converter unit 130 into which the blind holes 134 do not extend.

In the embodiment shown in FIG. 4, the converter unit 130 is in a form of a single, unitary converter plate 131 comprising multiple blind holes 134 extending through a portion L of the thickness T of the converter plate 131 but do not extend through the whole thickness T of the converter plate 131.

The multiple blind holes 134 are preferably arranged so that they are substantially parallel in the converter plate 134. Hence, the longitudinal axes of the blind holes 134 are preferably substantially parallel with each other.

The converter plate 131 generally comprises a first main side 132 adapted to face the incident radiation 6 and a second main side 133 opposite to the first main side 131. In a preferred embodiment, the second main side 133 facing away from the incident radiation 6 comprises the entrances of the blind holes 134.

Examples of suitable metal materials for the converter plate 131 in FIG. 4 but also of the solid converter plate 135 in FIG. 3 include tungsten, tungsten alloys, copper, copper alloys, rhenium, rhenium alloys, molybdenum, molybdenum alloys, tantalum, tantalum alloys, chromium, chromium alloys, iron and iron alloys. Particularly, suitable materials are tungsten and tungsten alloys.

The incident radiation 6 will hit the metal material of the solid portion of the converter plate 131 and are there, through the electromagnetic interaction, converted into electrons 8. The design of the converter unit 130 with blind holes 134 extending merely a portion L of the thickness T of the converter unit 130 will be very efficient in stopping lateral electrons, photons or particles, i.e., traveling in a direction perpendicular to the thickness T of the converter unit 130 and perpendicular to the longitudinal axes of the blind holes 134. The reason being that these scattered electrons, photons or particles will be stopped in the walls of the blind holes 134. Consequently, the particular design of the converter unit 130 will reduce the amount of lateral or scattered electrons 8 exiting the converter unit 130. This reduction in electron scattering will in turn reduce blurring of a signal representing detected electrons.

Each blind hole 134 will operate as an ionization chamber in which energetic electrons ejected from the converter plate 131 create a large number of ion pairs, i.e. ions and free electrons. This means that if the blind holes 134 are made deeper, i.e., larger L in FIG. 4, then the available gas volume in the blind holes 134 will increase and also wall areas of the blind holes 134 will increase contributing to a higher conversion of incident radiation 6 into electrons 8. Accordingly, a signal, representing free electrons, will increase proportionally. The available gas volume is also dependent on the open area, e.g. diameter, of the blind holes 134.

FIG. 5 is a cross-sectional view of another embodiment of a converter unit 130 comprising multiple blind holes 134. In this embodiment, the converter unit 130 is not made of a single, unitary converter plate but rather comprises a converter plate 136 with multiple through holes 134 and a solid converter plate 135.

The through holes 134 in the converter plate 136 are preferably true through holes 134 and thereby preferably extend through the whole thickness of the converter plate 136. The solid converter plate 131 is then attached to the converter plate 136 with through holes 134 as a lid for the multiple through holes 134 to thereby form a converter unit 130 with multiple blind holes 134.

The solid converter plate 135 is preferably attached with an airtight and electrically conducting or electrically insulating connection or bond to the converter plate 136 with the through holes 134.

The two converter plates 135, 136 can be made of a same metal material or different metal materials. The converter plate 136 with the through holes 134 is preferably made of a metal material as previously discussed for the converter plate 131 of FIG. 4, i.e., tungsten, tungsten alloys, copper, copper alloys, rhenium, rhenium alloys, molybdenum, molybdenum alloys, tantalum, tantalum alloys, chromium, chromium alloys, iron and iron alloys. Particularly, suitable materials are tungsten and tungsten alloys. The solid converter plate 135 could also be made of a metal material selected from this group of metals and metal alloys. However, it is alternatively possible to manufacture the solid converter plate 135 from a material selected among aluminum, an aluminum alloy and stainless steel.

In the embodiment shown in FIG. 6 the converter unit 130 comprises multiple, i.e., at least two, converter plates 136A, 136B, each of which has multiple through holes 134 extending through the whole thickness of respective converter plate 136A, 136B. These multiple converter plates 20A, 20B are attached together to form a layered structure as shown in the figure. The multiple converter plates 136A, 136B are preferably arranged in the resulting layered structure so that the multiple through holes 134 of the converter plates 136A, 136B are aligned.

This means that the final blind holes 134 of the converter unit 130 are formed by aligned and corresponding through holes 134 in each converter plate 136A, 136B once these are attached to each other in the layered structure as shown in FIG. 6 and the layered structure is attached to the solid converter plate 135.

The different converter plates 136A, 136B with through holes 134 can be attached to each other in a similar way that have been discussed in the foregoing in connection with FIG. 5 and attaching the converter plate 136 with through holes 134 to the solid converter plate 135. This means that the connections between the multiple converter plates 136A, 136B with through holes 134 and between the first converter plate 136A with through holes 134 and the solid converter plate 135 are preferably airtight and electrically conducting or electrically insulating connections or bonds.

The multiple converter plates 136A, 136B with through holes 134 could all be made of a same metal material. However, it is in fact possible to use different metal materials for different converter plates 136A, 136B with through holes 134. The metal material(s) for the converter plates 136A, 136B with through holes 134 is(are) preferably selected from the group previously discussed herein in connection with FIG. 5.

If the multiple converter plates 136A, 136B are electrically insulated from each other, each such converter plate 136A, 136B and the solid converter plate 135 could be connected to a voltage source 180. This enables creation of an electric field that accelerates electrons 8 formed in the converter unit 130 towards the second main side 133 and towards the electron amplification device 140. By electrically isolating the converter plates 136A, 136B from each other it is further possible to adapt the electric field in the converter unit 130, for instance by having different potential differences between adjacent converter plates 136A, 136B.

More information of converter units 130 that can be used in the detector 100 according to the embodiments can be found in documents [3, 4].

Figure 8:
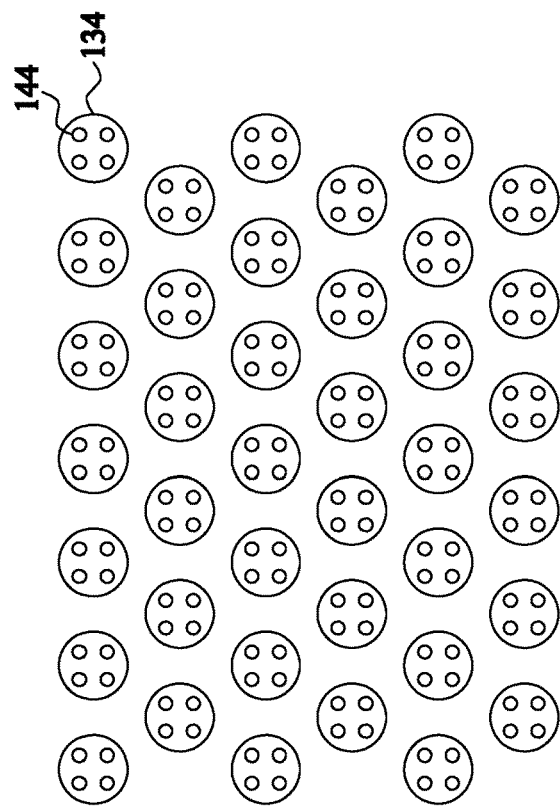
FIG. 8 schematically illustrates an embodiment of aligning blind holes of a converter unit and through holes of an electron amplification device.

In an embodiment, at least a portion of the multiple through holes 144 of the electron amplification device 140 are aligned with the multiple blind holes 134 of the converter unit 130 as schematically indicated in FIG. 8. In such an embodiment, the diameter or the cross-sectional area of the through holes 144 in the electron amplification device 140 is typically smaller than the corresponding diameter or cross-sectional area of the blind holes 134 in the converter unit 140.

For instance, the multiple through holes 144 could be divided into multiple groups of at least one through hole 144. Each such group of the multiple groups is then aligned with a respective blind hole 134. FIG. 8 schematically illustrates this approach with four through holes 144 per group, so that four such through holes 144 are aligned with a respective blind hole 134.

More information of aligning through holes 144 of the electron amplification device 140 with blind holes 134 of the converter unit 130 can be found in documents [3, 4].

It is, however, not necessary to align the through holes 144 with the blind holes 134. For instance, by having an electron amplification device 140 with a smaller pitch for the pattern of through holes 144 in the electron amplification device 140 as compared to the converter unit 130 then a certain number of through holes 140 will always match a blind hole 134 in the converter unit 130. This approach thereby reduces the need for any alignment.

The converter unit 130 could be separated with a small gas gap from the electron amplification device 140. However, it is possible to have an airtight connection between the converter unit 130 and the electron amplification device 140, such as an airtight and electrically insulated connection 145 as indicated in FIG. 7.

In an embodiment, the read-out device 150 is arranged with a small gas gap between the electron amplification device 140 and the read-out device 140 as shown in FIG. 7. It is, however, also possible to attach the read-out device 150 to the main side electron amplification device 140 facing away from the converter unit 130. In such a case, an electrically insulating connection is preferably employed.

In an embodiment, a voltage source 180 is connected to the electron amplification device 140 and the read-out device 150. The voltage source 180 is adapted to apply a voltage and thereby generate an electric field across the gas gap or the electrically insulating connection to force electrons 9 exiting the electron amplification device 140 towards the read-out device 150 for detection therein.

In the foregoing, a voltage source 180 has been discussed to provide an electric field between the electrodes 111, 112 in the ionization chamber 110, between converter plates 136A, 136B in the converter unit 130, optionally between the converter unit 130 and the electron amplification device 140, between the electrode layers 141, 142 of the electron amplification device 140 and between the electron amplification device 140 and the read-out device 150. In such a case, a same voltage source 180 could be used in all these instances, or more than one voltage source 180 could be used.

The read-out device 150 is preferably a two-dimensional (2D) charge sensitive device. There are various such 2D charge sensitive devices available in the art including, for instance, a thin-film transistor (TFT) panel.

Other possible read-out devices 150 that can be used in the detector 100 include direct readout, for instance, through metallized pixels and stacked printed circuit boards (PCBs) with edge patterned pixels [9]. Further examples are also discussed in document [6], see for instance section 2.1.4 Electronic readout system.

In an embodiment, the detector 100 comprises a detector housing 170. The ionization chamber 110 is then arranged upstream of the detector chamber 120 in the detector housing 170 with regard to a direction of the incident radiation 6.

The detector housing 170 preferably comprises a lid 171 arranged upstream of the ionization chamber 110 in the direction of the incident radiation 6. The detector housing 170 is preferably made of a material selected from the group consisting of plastic, such as poly(methyl methacrylate) (PMMA) or polyethylene terephthalate (PET), carbon composite and aluminum.

In an embodiment, the detector housing 170 is made as a unitary structure of a same material. In another embodiment, the detector housing 170 could comprise an upstream detector housing enclosing the ionization chamber 110 and a downstream detector housing enclosing the detector chamber 120. In such a case, different materials can be used for the upstream detector housing and the downstream detector housing. For instance, the upstream detector housing could be made of plastic, whereas the downstream detector housing is made of carbon composite or a metal, such as aluminum.

The lid 171 is correspondingly preferably made of a material selected from the group consisting of plastic, such as PMMA or PET, and carbon composite. This lid 171 is, thus, preferably made of a material with an atomic number similar to the ambience, such as ambient air, water or tissue.

In an embodiment, a second lid 172 is arranged downstream of the detector chamber 172 in the direction of the incident radiation 6. This second lid 172 can be made of a material selected from the same group as the first lid 171 for the ionization chamber 110 mentioned above.

The first lid 171, and optionally also the second lid 172, could be in the form of a thin sheet, foil or membrane of the above mentioned materials. In addition, an electrically conductive layer may optionally be provided on the bottom side of the first lid 171 facing the ionization chamber 110, and optionally on the top side of the second lid 172, facing the detector chamber 120. The first lid 171 may, thus, be regarded as a window into the ionization chamber 110 for the incident radiation 6.

In an embodiment, the detector chamber gas 121 is selected from the group consisting of argon, xenon, carbon dioxide, dimethyl ether (DME) and a mixture thereof. However, other quenching gases or penning mixtures are possible. In an embodiment, the detector chamber 120 is sealed. In such a case, a sealing O-ring 173, or other seal, could be provided between the second lid 172 and the detector housing 170 to keep the detector chamber gas 121 inside the detector chamber 120. The detector chamber gas 121 may be kept at ambient pressure or at a pressure different from the ambient pressure, such as at a higher pressure as compared to ambient pressure.

The ionization chamber gas 114 is preferably selected from the group consisting of air, argon, xenon, carbon dioxide, dimethyl ether (DME) and a mixture thereof. In the case of air as ionization chamber gas 114, there is no need for any gas tight connection between the lid 171 and the detector housing 170 unless the air inside the ionization chamber 110 should be pressurized. Hence, the ionization chamber 110 is in a so-called vented realization using air at atmospheric pressure. However, it is generally preferred if the air is dried to avoid or at least minimize the influence of variations in humidity. It is, though, possible to use a sealed ionization chamber 110, such as with an O-ring or other seal, both with non-air or air ionization chamber gases. The ionization chamber gas may be at ambient pressure or another pressure in similarity to the detector chamber 120.

Pressure and/or temperature sensors may optionally be arranged in the ionization chamber 110. In such a case, the sensors can be used for correcting the measured ionization current based on pressure and/or temperature variations.

Another aspect of the embodiments relates to a method of generating an image frame based on incident radiation 6. The method comprises, see FIG. 17, measuring, in step S1, an ionization current between a first electrode 111 and a second electrode 112 induced by the incident radiation 6. The first electrode 111 and the second electrode 112 are comprised in an ionization chamber 110 comprising an ionization chamber gas 114. The method also comprises generating, in step S2 and by a read-out device 150, a signal representative of the incident radiation 6. The read-out device 150 is comprised in a detector chamber 120 comprising a converter unit 130 adapted to convert incident radiation 6 into electrons 8, an electron amplification device 140 adapted to produce further electrons 9 from the electrons 8, the read-out device 150 and a detector chamber gas 121. The ionization chamber 110 is arranged upstream of the detector chamber 120 with regard to a direction of the incident radiation 6. The method further comprises generating, in step S3, a corrected signal by processing the signal representative of the incident radiation based on the current signal. The method further comprises generating, in step S4, the image frame based on the corrected signal.

Figure 18:
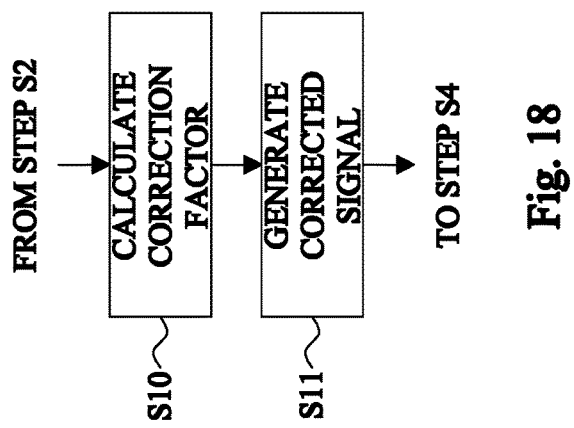
FIG. 18 is a flow chart illustrating generating a corrected signal in FIG. 17 according to an embodiment.
Figure 17:
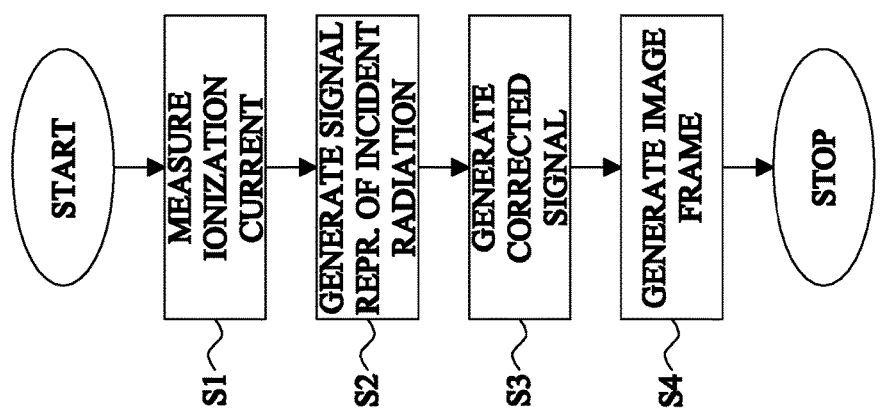
FIG. 17 is a flow chart illustrating a method of generating an image frame based on incident radiation according to an embodiment.

FIG. 18 is a flow chart illustrating an embodiment of step S3 in FIG. 17. The method continues from step S2 in FIG. 17. A next step S10 comprises calculating a correction factor based on the signal representative of the incident radiation and the current signal. The corrected signal is then generated in step S11 based on the signal representative of the incident radiation and the correction factor. The method then continues to step S4 in FIG. 17.

In an embodiment, the first electrode 111 is a first plate electrode 111 comprising multiple first electrically unconnected electrode sectors 115 and the second electrode 112 is a second plate electrode 112 comprising multiple second electrically unconnected electrode sectors 116. At least a portion of the multiple first electrically unconnected electrode sectors 115 is aligned with at least a portion of the multiple second electrically unconnected electrode sectors 116 to form pairs of aligned first and second electrode sectors 115, 116. In such an embodiment, step S1 in FIG. 17 preferably comprises measuring, for each pair of aligned first and second electrode sectors 115, 116, an ionization current between the pair of aligned first and second electrode sectors 115, 116 and generating a current signal representative of the measured ionization current.

In an embodiment, the first electrode 111 is a first plate electrode 111 and the second electrode 112 is a second plate electrode 112. At least one of the first plate electrode 111 and said second plate electrode 112 comprises multiple electrically separated electrode sectors 115, 116. The read-out device 150 is a pixelated read-out device 150 comprising multiple pixels 151. Each pixel 150 of the multiple pixels 151 is preferably adapted to generate a signal representative of incident radiation detected at the pixel 151. In such an embodiment, step S3 in FIG. 17 preferably comprises generating, for each pixel 151 of the multiple pixels 151, a corrected signal by processing the signal representative of incident radiation, detected at the pixel 151, based on a current signal representative of an ionization current measured between a pair of aligned electrically separated electrode sectors 115, 116 in the first plate electrode 111 and the second plate electrode 112 or between an electrically separated electrode sector 115 in one of the first plate electrode 111 and the second plate electrode 112 and the other of the first plate electrode 111 and the second plate electrode 112. The pixel 151 is comprised in an area of the read-out device 150. This area is aligned with the pair of aligned electrically separated electrode sectors 115, 116 or the electrically separated electrode sector 115.

In an embodiment, step S3 of FIG. 17 comprises calculating, for a pixel 151 at position (x,y) of the multiple pixels 151, a correction factor CF based on $$k \times \frac{\sum_{x=a}^{a+m-1} \sum_{y=b}^{b+n-1} P(x, y)}{\int_{t_1}^{t_2} i \, dt}$$

Step S3 preferably also comprises generating a corrected pixel value $P_{corr}(x,y)$ for the pixel 151 at position (x,y) corresponding to the corrected signal as $P_{corr}(x,y) = CF \times P(x,y)$.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] U.S. patent application no. US 2002/0149305
[2] U.S. Pat. No. 7,994,483
[3] International application no. WO 2015/034419
[4] International application no. WO 2016/139248
[5] International application no. WO 2007/061235
[6] Janina Östling, New Efficient Detector for Radiation Therapy Imaging using Gas Electron Multipliers, Doctorial Thesis, Stockholm, 2006
[7] U.S. Pat. No. 8,134,129
[8] Iacobaeous et al., Study of capillary-based gaseous detectors, *IEEE T. Nucl. Sci.* 51(3): Part 1, June 2004
[9] U.S. Pat. No. 6,841,784
[10] Gordon et al., Image reconstruction from projections, *Sci Am.*, 233(4):56-68, 1975

The invention claimed is:

1. A detector comprising:
    an ionization chamber comprising:
        a first electrode;
        a second electrode; and
        an ionization chamber gas;
    a detector chamber comprising:
        a converter unit adapted to convert incident radiation into electrons;
        an electron amplification device adapted to produce further electrons from said electrons;
        a read-out device adapted to generate a signal representative of said incident radiation; and
        a detector chamber gas, wherein said ionization chamber is arranged upstream of said detector chamber with regard to a direction of said incident radiation; and
    a signal processor adapted to generate a corrected signal by processing said signal representative of said incident radiation based on a current signal representative of an ionization current measured between said first electrode and said second electrode and induced by said incident radiation.

2. The detector according to claim 1, wherein said signal processor is adapted to
    calculate a correction factor based on said signal representative of said incident radiation and said current signal; and
    generate said corrected signal based on said signal representative of said incident radiation and said correction factor.

3. The detector according to claim 1, further comprising a voltage source adapted to apply a voltage potential between said first electrode and said second electrode.

4. The detector according to claim 1, further comprising an electrometer circuitry adapted to measure said ionization current between said first electrode and said second electrode and to generate said current signal.

5. The detector according to claim 1, wherein
    said first electrode is a first plate electrode; and
    said second electrode is a second plate electrode substantially parallel to said first plate electrode.

6. The detector according to claim 5, wherein at least one of said first plate electrode and said second plate electrode comprises multiple electrically separated electrode sectors.

7. The detector according to claim 6, wherein
said first plate electrode comprises multiple first electrically separated electrode sectors; and
said second plate electrode comprises multiple second electrically separated electrode sectors.

8. The detector according to claim 7, wherein at least a portion of said multiple first electrically separated electrode sectors is aligned with at least a portion of said multiple second electrically separated electrode sectors to form pairs of aligned first and second electrode sectors.

9. The detector according to claim 8, further comprising an electrometer circuitry adapted to measure, for each pair of aligned first and second electrode sectors, an ionization current between said pair of aligned first and second electrode sectors and generate a current signal representative of said measured ionization current.

10. The detector according to claim 8, wherein said electron amplification device comprises:
an intermediate insulation layer;
a first electrode layer arranged on a first main side of said intermediate insulation layer and comprising multiple first electrically separated electrode layer sectors;
a second electrode layer arranged on a second, opposite main side of said intermediate insulation layer and comprising multiple first electrically separated electrode layer sectors, wherein at least a portion of said multiple first electrically separated electrode layer sectors is aligned with at least a portion of said multiple second separated electrode layer sectors to form pairs of aligned first and second electrode layer sectors, and at least a portion of said pairs of aligned first and second electrode sectors is aligned with at least a portion of said pairs of aligned first and second electrode layer sectors; and
multiple through holes extending through a whole thickness of said electron amplification device.

11. The detector according to claim 1, wherein said read-out device is a pixelated read-out device comprising multiple pixels, each pixel of said multiple pixels is adapted to generate a signal representative of incident radiation detected at said pixel.

12. The detector according to claim 11, wherein
said first electrode is a first plate electrode and said second electrode is a second plate electrode;
at least one of said first plate electrode and said second plate electrode comprises multiple electrically separated electrode sectors; and
said signal processor is adapted to generate, for each pixel of said multiple pixels, a corrected signal by processing said signal representative of incident radiation, detected at said pixel, based on a current signal representative of an ionization current measured between a pair of aligned electrically separated electrode sectors in said first plate electrode and said second plate electrode or between an electrically separated electrode sector in one of said first plate electrode and said second plate electrode and the other of said first plate electrode and said second plate electrode, said pixel is comprised in an area of said read-out device, said area is aligned with said pair of aligned electrically separated electrode sectors or said electrically separated electrode sector.

13. The detector according to claim 12, wherein said signal processor is adapted to
calculate, for a pixel at position (x,y) of said multiple pixels, a correction factor CF based on $$k \times \frac{\sum_{x=a}^{a+m-1} \sum_{y=b}^{b+n-1} P(x,y)}{\int_{t_1}^{t_2} i\, dt}$$

wherein k is a scale factor, P(x,y) is a pixel value for said pixel at position (x,y) in said pixelated read-out device and corresponding to said signal representative of said incident radiation, (a,b) is a position of a first pixel in said area of said pixelated read-out device aligned with said pair of aligned electrically separated electrode sectors or said electrically separated electrode sector, m×n is a size of said area in number of pixels, i is an ionization current measured over said pair of aligned electrically separated electrode sectors or said electrically separated electrode sector and the other of said first plate electrode and said second plate electrode, $t_1$ is a start time for an image frame of said pixelated read-out device and $t_2$ is an end time for said image frame; and
generate a corrected pixel value $P_{corr}(x,y)$ for said pixel at position (x,y) corresponding to said corrected signal as $P_{corr}(x,y)=CF \times P(x,y)$.

14. The detector according to claim 1, wherein said ionization chamber comprises N plate electrodes substantially parallel to each other, N is an integer equal to or larger than 3.

15. The detector according to claim 14, wherein said ionization chamber comprises:
a top ionization chamber comprising said first electrode and said second electrode; and
a downstream bottom ionization chamber comprising a third electrode and a fourth electrode.

16. The detector according to claim 15, wherein said second electrode is in the form of an electrically conductive layer arranged on a first main side of an intermediate insulating substrate and said third electrode is in the form an electrically conductive layer arranged on a second, opposite main side of said intermediate insulating substrate.

17. The detector according to claim 1, wherein said converter unit comprises a solid converter plate.

18. The detector according to claim 1, wherein said converter unit comprises multiple blind holes forming respective ionization chambers and extending through a portion of a thickness of said converter unit but do not extend through a whole thickness of said converter unit.

19. The detector according to claim 18, wherein said converter unit comprises:
a converter plate with multiple through holes; and
a solid converter plate attached to said converter plate with said multiple through holes as a lid for said multiple through holes to form said multiple blind holes.

20. The detector according to claim 19, wherein
said converter unit comprises multiple converter plates, each converter plate of said multiple converter plates has multiple through holes;
said multiple converter plates are attached together to form a layered structure in which said multiple through holes of said multiple converter plates are aligned; and
said solid converter plate is attached to said layered structure as a lid for said multiple through holes to form said multiple blind holes.

21. The detector according to claim 20, wherein said multiple converter plates are electrically isolated from each other.

22. The detector according to claim 18, wherein
said electron amplification device comprises multiple through holes; and
at least a portion of said multiple through holes are aligned with said multiple blind holes.

23. The detector according to claim 22, wherein
said multiple through holes are divided into multiple groups of at least one through hole; and
each group of said multiple groups is aligned with a respective blind hole.

24. The detector according to claim 1, wherein said read-out device is a two-dimensional (2D) charge sensitive device.

25. The detector according to claim 1, further comprising a detector housing, wherein said ionization chamber is arranged upstream of said detector chamber in said detector housing with regard to a direction of said incident radiation.

26. A method of generating an image frame based on incident radiation, said method comprising:
measuring an ionization current between a first electrode and a second electrode induced by said incident radiation, said first electrode and said second electrode being comprised in an ionization chamber comprising an ionization chamber gas;
generating, by a read-out device, a signal representative of said incident radiation, said read-out device is comprised in a detector chamber comprising a converter unit adapted to convert incident radiation into electrons, an electron amplification device adapted to produce further electrons from said electrons, said read-out device and a detector chamber gas, wherein said ionization chamber is arranged upstream of said detector chamber with regard to a direction of said incident radiation;
generating a corrected signal by processing said signal representative of said incident radiation based on said current signal; and
generating said image frame based on said corrected signal.

27. The method according to claim 26, wherein generating said corrected signal comprises:
calculating a correction factor based on said signal representative of said incident radiation and said current signal; and
generating said corrected signal based on said signal representative of said incident radiation and said correction factor.

28. The method according to claim 26, wherein
said first electrode is a first plate electrode comprising multiple first electrically separated electrode sectors;
said second electrode is a second plate electrode comprising multiple second electrically separated electrode sectors, wherein at least a portion of said multiple first electrically separated electrode sectors is aligned with at least a portion of said multiple second electrically separated electrode sectors to form pairs of aligned first and second electrode sectors; and measuring said ionization current comprises measuring, for each pair of aligned first and second electrode sectors, an ionization current between said pair of aligned first and second electrode sectors and generating a current signal representative of said measured ionization current.

29. The method according to claim 26, wherein
said first electrode is a first plate electrode and said second electrode is a second plate electrode;
at least one of said first plate electrode and said second plate electrode comprises multiple electrically separated electrode sectors;
said read-out device is a pixelated read-out device comprising multiple pixels, each pixel of said multiple pixels is adapted to generate a signal representative of incident radiation detected at said pixel; and
generating said corrected signal comprises generating, for each pixel of said multiple pixels, a corrected signal by processing said signal representative of incident radiation, detected at said pixel, based on a current signal representative of an ionization current measured between a pair of aligned electrically separated electrode sectors in said first plate electrode and said second plate electrode or between an electrically separated electrode sector in one of said first plate electrode and said second plate electrode and the other of said first plate electrode and said second plate electrode, said pixel is comprised in an area of said read-out device, said area is aligned with said pair of aligned electrically separated electrode sectors or said electrically separated electrode sector.

30. The method according to claim 29, wherein generating said corrected signal comprises:
calculating, for a pixel at position (x,y) of said multiple pixels, a correction factor CF based on $$k \times \frac{\sum_{x=a}^{a+m-1} \sum_{y=b}^{b+n-1} P(x, y)}{\int_{t_1}^{t_2} i\, dt}$$

wherein k is a scale factor, P(x,y) is a pixel value for said pixel at position (x,y) in said pixelated read-out device and corresponding to said signal representative of said incident radiation, (a,b) is a position of a first pixel in said area of said pixelated read-out device aligned with said pair of aligned electrically separated electrode sectors or said electrically separated electrode sector, m×n is a size of said area in number of pixels, i is an ionization current measured over said pair of aligned electrically separated electrode sectors or said electrically separated electrode sector and the other of said first plate electrode and said second plate electrode, $t_1$ is a start time for an image frame of said pixelated read-out device and $t_2$ is an end time for said image frame; and
generating a corrected pixel value $P_{corr}(x,y)$ for said pixel at position (x,y) corresponding to said corrected signal as $P_{corr}(x,y)=CF \times P(x,y)$.

* * * * *